United States Patent [19]

Polidan et al.

[11] Patent Number: 5,213,178
[45] Date of Patent: May 25, 1993

[54] TRACTION CONTROL SYSTEM WITH FUEL AND SPARK CONTROL

[75] Inventors: Jeffrey M. Polidan, Fenton; Donald W. Harnack, Dearborn, both of Mich.

[73] Assignee: General Motors Corporation, Detroit, Mich.

[21] Appl. No.: 871,528

[22] Filed: Apr. 21, 1992

[51] Int. Cl.⁵ .............................................. B60K 28/16
[52] U.S. Cl. ................................ 180/197; 364/426.03; 123/417
[58] Field of Search .................... 180/197; 364/426.01, 364/426.03, 424.1; 123/417, 416

[56] References Cited

U.S. PATENT DOCUMENTS

| | | | |
|---|---|---|---|
| 4,432,430 | 2/1984 | Lind et al. | 180/197 |
| 4,856,610 | 8/1989 | Leiber et al. | 180/197 |
| 4,860,849 | 8/1989 | Andersson et al. | 180/197 |
| 4,951,773 | 8/1990 | Poirier et al. | 180/197 |
| 5,012,882 | 5/1991 | Oono et al. | 180/197 |
| 5,025,881 | 6/1991 | Poirier et al. | 180/197 |
| 5,060,746 | 10/1991 | Nobumoto et al. | 180/197 |
| 5,067,579 | 11/1991 | Kushi et al. | 180/197 |
| 5,083,479 | 1/1992 | Ito et al. | 180/197 |
| 5,099,942 | 3/1992 | Kushi et al. | 180/197 |

*Primary Examiner*—David M. Mitchell
*Assistant Examiner*—Kevin Hurley
*Attorney, Agent, or Firm*—Howard N. Conkey

[57] ABSTRACT

The torque reduction of an internal combustion engine in response to an excessive acceleration spin condition is provided by a combination of disabling selected engine cylinders and spark retard. When a reduction of engine torque output is required in response to an excessive acceleration spin condition of the vehicle, the first level of torque reduction is provided at a level less than the torque reduction resulting from disabling a single cylinder of the engine by retarding the spark timing of the spark ignition in the cylinders. The amount of the retard of spark timing is such that the resulting torque reduction is less than the torque reduction resulting from disabling a single cylinder of the engine.

3 Claims, 6 Drawing Sheets

TRACTION CONTROL SYSTEM WITH FUEL AND SPARK CONTROL

BACKGROUND OF THE INVENTION

This invention relates to a vehicle traction control system.

Various methods have been proposed for preventing an excessive spinning condition of the driven wheels of a vehicle during vehicle acceleration when the operator initiated engine torque delivered to the vehicle driven wheels are such that the frictional forces between the tire and the road surface are overcome. These methods include the adjustment of engine torque and/or the application of the brakes of the driven wheels when an excessive acceleration spinning condition is detected. One method of adjusting engine torque output for limiting wheel spin during vehicle acceleration controls the individual injectors in a port injected internal combustion engine so as to selectively withhold fuel from selected cylinders. This disabling of cylinders reduces the engine torque output to limit acceleration spin. In general, the number of cylinders to which fuel is withheld determines the amount of reduction in the engine torque output.

In the foregoing form of traction control in which the engine output torque is reduced by selectively disabling engine cylinders, each cylinder disabled represents a relatively large reduction in the torque output of the engine. Typically, the first cylinder disabled usually produces the greatest power loss. As a result, on a dry road launch of the vehicle, the torque reduction provided by disabling one of the engine cylinders in response to a sensed excessive acceleration spin condition may be greater than the torque reduction necessary for control of the acceleration spin thereby resulting in less than optimum acceleration performance of the vehicle. Further, the large shift in power as the first cylinder is disabled may result in a perceived sag in the vehicle performance. Accordingly, it would be desirable to provide for a torque reduction level that is less than the torque reduction resulting from disabling one cylinder of the engine to accommodate acceleration conditions, such as a dry road launch, requiring a smaller torque reduction to arrest the excessive acceleration spin condition.

The amount of the torque reduction associated with disabling one cylinder of the engine may be reduced by creating "half" cylinder increments by disabling a given cylinder such as on every other engine cycle or even every third engine cycle. However, in practice this approach may produce rough engine operation due to the cylinder toggling on and off. It would be more desirable and result in smoother engine operation if the number of cylinders enabled during the traction control cycle remains constant or changes gradually.

SUMMARY OF THE INVENTION

In accord with this invention, the torque reduction of the internal combustion engine in response to an excessive spin condition is provided by a combination of disabling selected engine cylinders and spark retard.

According to this invention, when a reduction of engine torque output is required in response to an excessive acceleration spin condition of the vehicle, the first level of torque reduction is provided at a level less than the torque reduction resulting from disabling a single cylinder of the engine by retarding the spark timing of the spark ignition in the cylinders. The amount of the retard of spark timing is such that the resulting torque reduction is less than the torque reduction resulting from disabling a single cylinder of the engine. This added step improves the granularity in the engine torque control which results in improved acceleration performance and ride quality.

By incorporating the smaller first torque reduction step via spark retard, when the amount of engine torque reduction required to control acceleration spin condition is less than the torque reduction resulting from the disabling of a single cylinder, such as may occur during vehicle launch on a dry road, traction control is provided solely by spark timing control. Control is thereby provided at a lower torque reduction level thereby improving acceleration performance and ride quality. Further, since spark timing control responds faster than disabling a cylinder to reduce engine torque output, the response time of the system improves.

In a specific aspect of the invention, to shape the torque reduction across the complete engine speed band and to control the exhaust temperature, the spark retard amount for traction control is varied as a predetermined function of engine speed.

DESCRIPTION OF THE DRAWINGS

The invention may be best understood by reference to the following description of a preferred embodiment and the drawings in which:

Referring to FIG. 1, the present invention is described as applied to a vehicle 8 cylinder internal combustion engine 10 in which each cylinder is provided fuel via a respective one of 8 fuel injectors INJ1–INJ8. This form of fuel delivery system is commonly referred to as a port fuel injection system. Each cylinder has associated therewith a respective one of 8 spark plugs SP1–SP8 for igniting an air and fuel mixture in the cylinder Air is drawn into the intake manifold of the engine 10 via an intake throttle bore in a throttle body 12 having an operator controlled throttle therein for regulating air flow into the engine 10. Air and the fuel provided by an injector for a cylinder is drawn into the cylinder and ignited at a predetermined time in relation to the engine cycle via the cylinder spark plug to develop driving torque delivered to the driven wheels of the vehicle. The combustion gases from the cylinders are then discharged into an exhaust conduit 14 which includes a conventional three-way catalytic converter 16 and then to the atmosphere.

Figure 1:
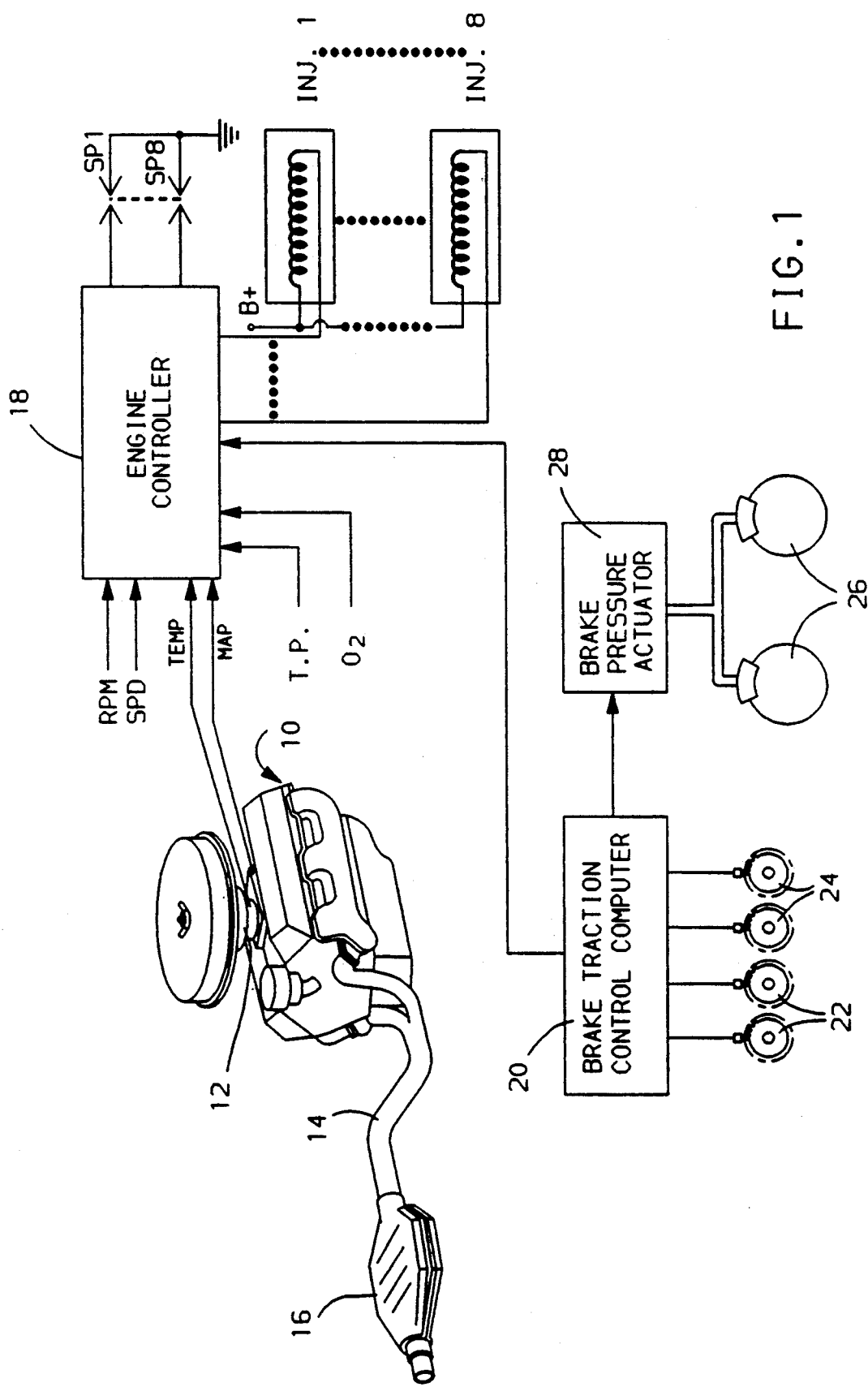
FIG. 1 illustrates the general form of a traction control system for a vehicle having a port fuel injected internal combustion engine and FIGS. 2, 3, and 4a–4d are flow diagrams illustrating the operation of the system of FIG. 1 in controlling the engine for traction control in accord with the principles of this invention.

The engine 10 is controlled by a conventional digital computer based engine controller 18. Included in this control is the conventional control of the individual fuel injectors INJ1–INJ8 for injecting fuel to each of the respective cylinders of the engine 10 in timed relation to engine rotation. In general, the injectors are controlled in response to various engine and vehicle operating parameters to achieve a scheduled air/fuel ratio. These parameters may include engine coolant temperature TEMP, manifold absolute pressure MAP, throttle position TP, engine speed RPM, vehicle speed and the output $O_2$ of an exhaust oxygen sensor each being provided by a conventional transducer.

The engine controller 18 further provides conventional control of ignition timing by control of spark timing signals provided to the spark plugs SP1-SP8 in timed relation to engine rotation. As per conventional practice, the desired timing of spark ignition is established relative to the top dead center crank position for each of the engine cylinders.

Initiation of ignition is typically desired prior to the top dead center position and ignition timing is calibrated in terms of engine crank angle degrees before top dead center. In general, the spark timing of the engine 10 is calibrated as close as possible to the MBT setting for maximizing engine output torque without causing pre-ignition or detonation. The result is a three-dimensional electronic lookup table in which the calibration timing values are stored as a function of engine speed and manifold absolute pressure.

To the extent that the timing calibration is retarded from the MBT setting, there is a corresponding reduction in the engine output torque, as compared to the MBT torque which would occur with ignition timed at the MBT setting established by the spark timing table referred above. Accordingly, by selectively retarding the spark timing of the signal applied to the spark plugs SP1-SP8, the engine torque output may be selectively reduced by a desired amount. As will be described, this invention provides for retarding the spark to provide engine torque reduction in response to an excessive acceleration spin condition by an amount that is less than the torque reduction provided by disabling one of the fuel injectors INJ1-INJ8.

As indicated, the engine controller 18 is digital computer based and takes the form of any well known digital computer controller used in present vehicles. Such controllers typically include a central processing unit, random access memory, read only memory, input/output circuits, timer circuits, analog-to-digital converter and a clock. Generally, the central processing unit in the controller 18 executes an operating program permanently stored in its read only memory which also contains calibration constants and values stored such as in lookup tables addressed in accord with the values of selected parameters.

Via the operating program stored in the read only memory of the controller 18, the various control functions including the control of the fuel injectors INJ-1-INJ8 for establishing a desired air/fuel ratio and for limiting the engine torque output for traction control is provided as well as the control of the spark ignition timing via the spark plugs SP1/SP8 for igniting the mixture drawn into the cylinders of the engine 10 and further in accord with the principles of this invention for reducing the engine torque output for traction control.

In one embodiment of the invention, traction control may be provided solely via engine torque control in response to the acceleration spin condition of the vehicle driven wheels. For example, the engine controller may further receive inputs from wheel speed sensors monitoring the speeds of the driven and undriven wheels of the vehicle. In response to these speed signals, the engine controller 18 executes a traction control routine which determines an excessive spin condition such as represented by wheel slip or rate of change in wheel slip and provides for control as hereinafter described in accord with this invention to limit the wheel spin.

In the preferred embodiment, the traction control is provided by both control of the brakes of the driven wheels and the engine torque output. The control of the driven wheel brakes is provided by a conventional brake traction control system that includes a brake traction control computer 20 that responds to the speeds of the vehicle driven wheels via speed sensors 22 and the speeds of the undriven wheels provided by wheel speed sensors 24. The brake traction control computer 20 actuates the driven wheel brakes 26 via a brake pressure actuator 28 to limit wheel spin when the speeds of the respective wheel speed sensors 22 and 24 represent an excessive acceleration spin condition in response to the application of excessive torque to the driven wheels via the internal combustion engine 10.

The brake traction control computer 20 may take any conventional form including a general purpose digital computer such as the digital controller 18. The brake pressure actuator 28 may also take any conventional form and may include, for example, a DC torque motor responding to a signal output of the traction control computer for controlling a piston establishing a controlled hydraulic pressure in the wheel brakes 26.

While operation of the driven wheel brakes 26 may operate to limit wheel spin, it is undesirable to continuously apply large amounts of braking pressure to the driven wheels and further it may be desirable to provide for traction control solely by engine torque management when the amount of torque required to arrest an excessive spin condition may be achieved solely by engine torque reduction. For example, long periods of brake application for limiting wheel spin during conditions of high engine torque output may result in the brakes heating to unacceptable levels. In order to prevent this condition, the engine torque output is decreased by an amount established by the brake traction control computer 20 in accord with this invention by retarding the spark timing and further as required by selectively disabling the engine cylinders.

In the present embodiment, the brake traction control computer 20 determines and requests an amount of required engine torque in terms of the percent of maximum possible engine torque. This torque level request provided to the engine controller 18 is in the form of a constant frequency variable pulse width signal in which the pulse width (and therefore the duty cycle of the pulse width signal) directly represents the desired percent of maximum possible engine torque. In one embodiment, the duty cycle representing the desired percent of maximum possible engine torque output is determined as a predetermined function of the measured slip of the driven wheels and the rate of change of slip of the driven wheels.

Figure 2:
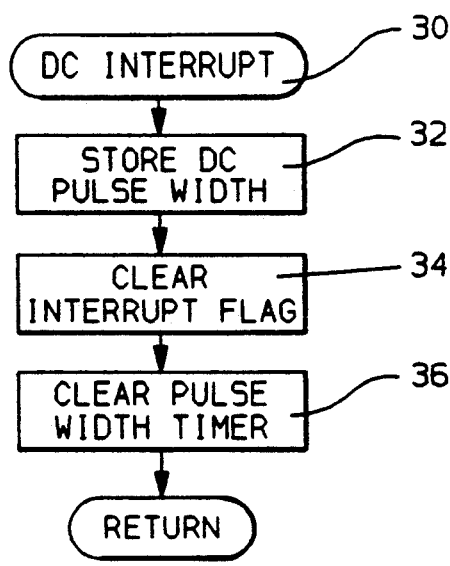
Figure 3:
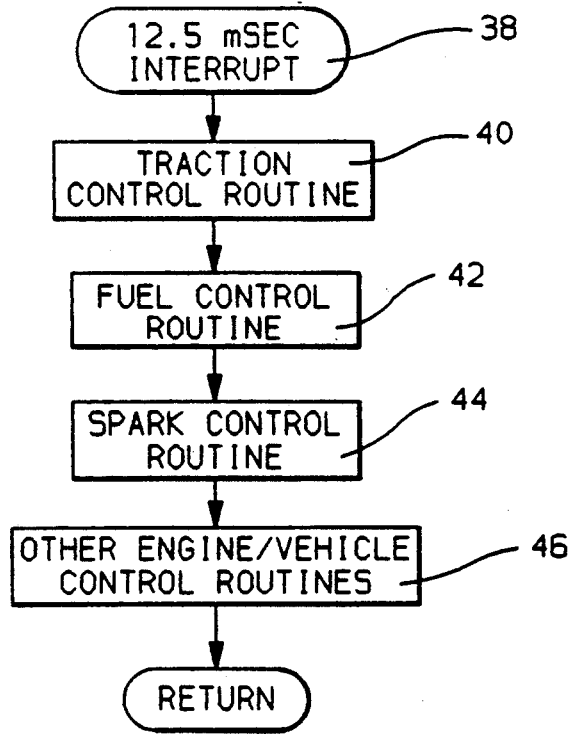
Figure 4A:
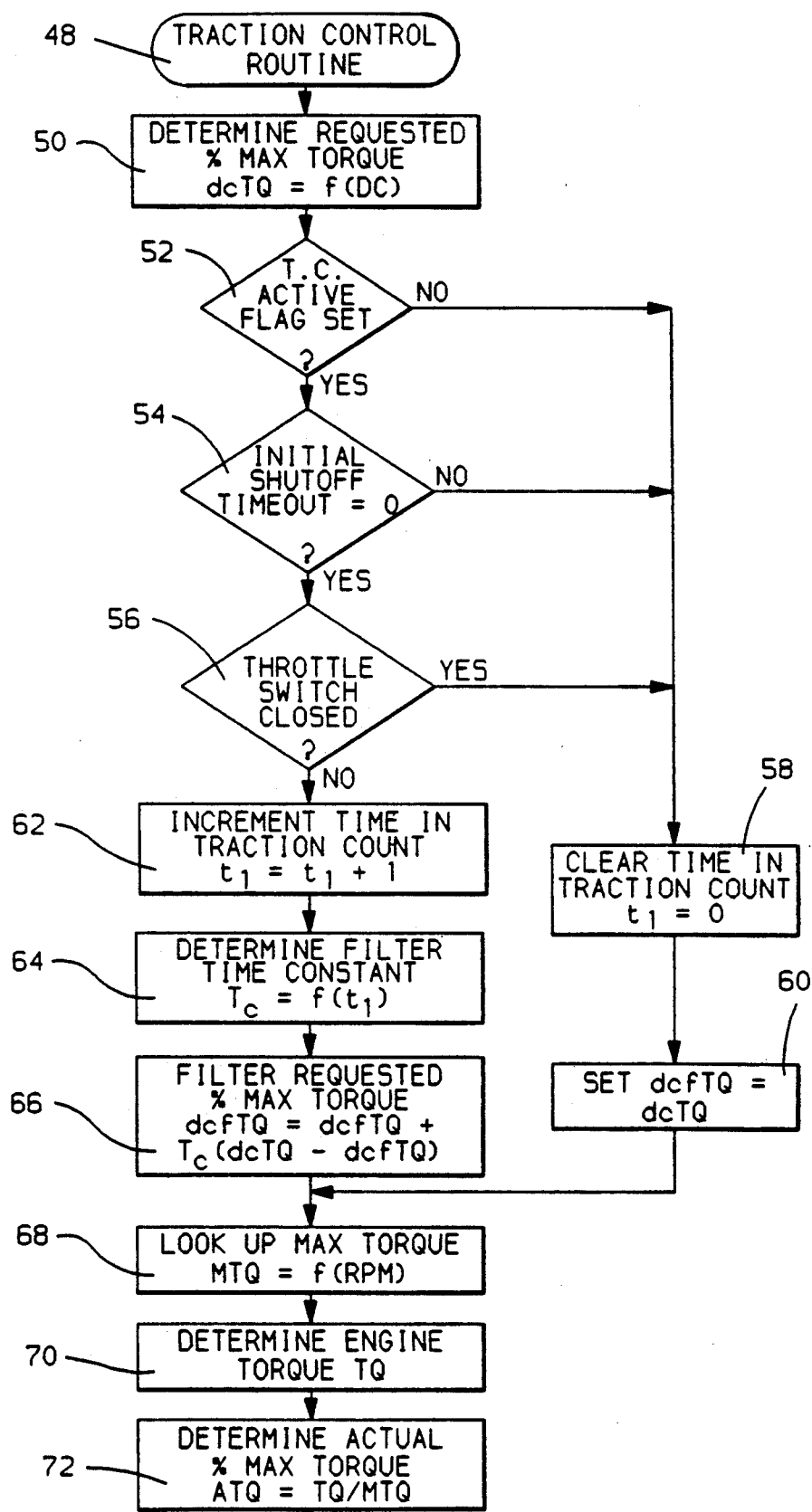
Figure 4B:
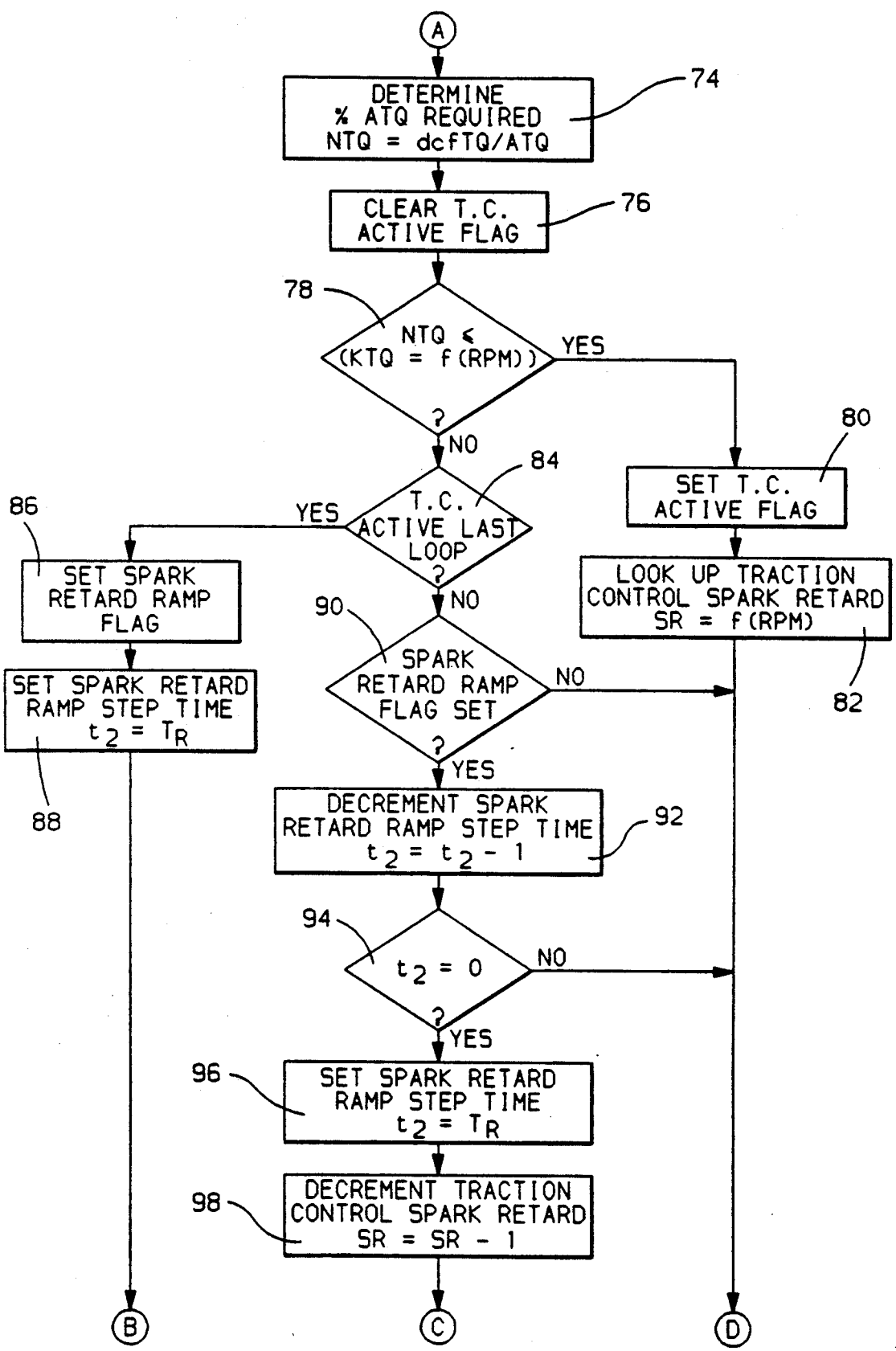
Figure 4C:
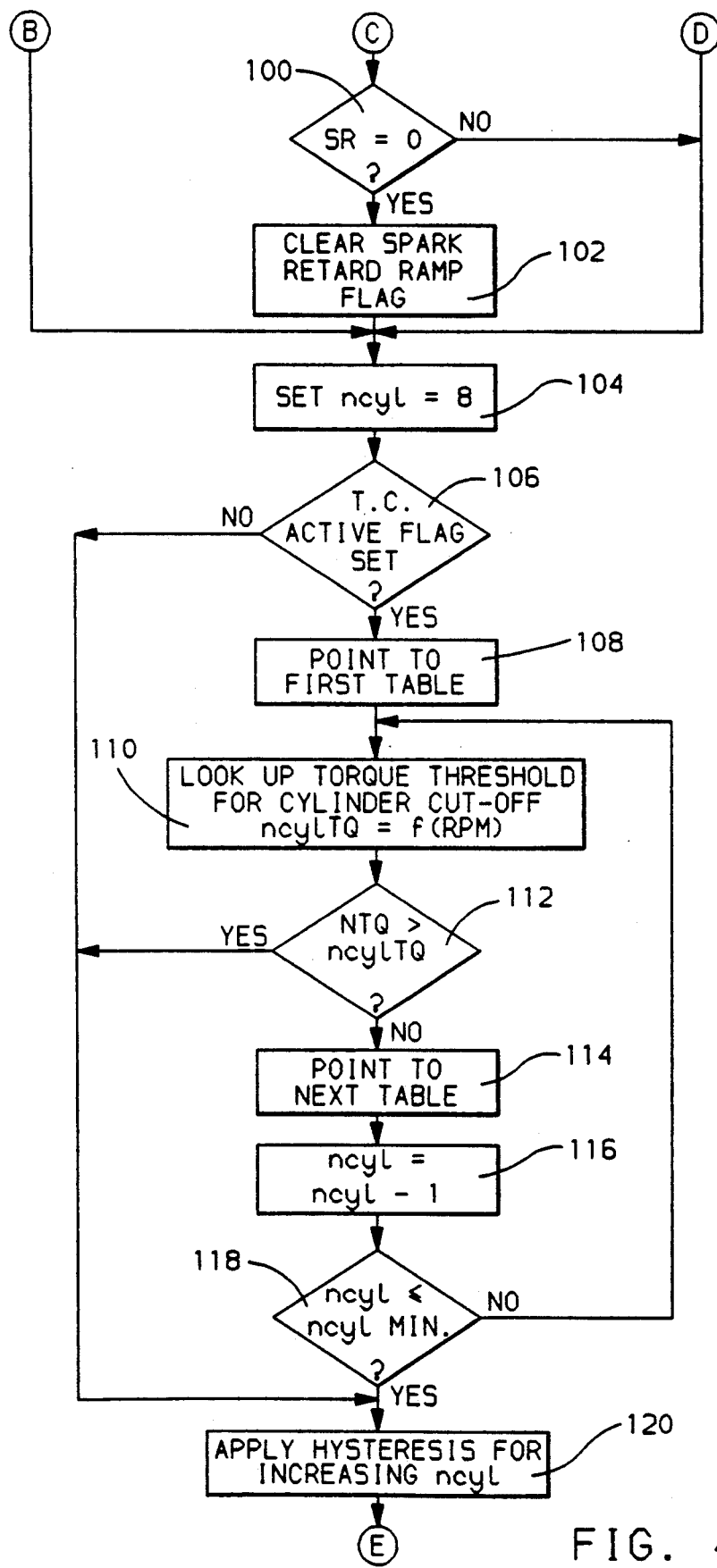
Figure 4D:
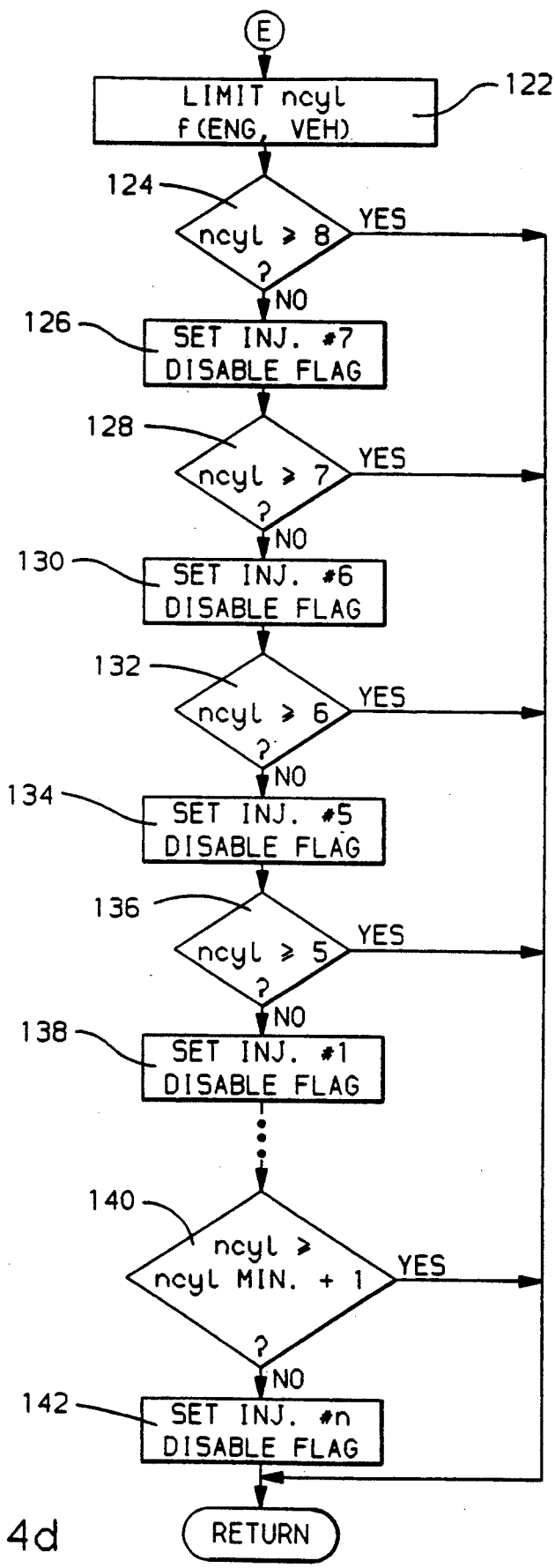

The control of engine torque to achieve the percent of maximum possible engine torque requested by the brake traction control computer 20 is illustrated in the FIGS. 2-4. The engine controller 18 may execute a plurality of interrupt routines in response to various interrupt signals. In the control of the ignition timing and the fuel injectors, two such interrupt routines are executed. One such routine used in the control of engine torque for traction control is an event driven interrupt routine responsive to the trailing edge of each of the pulses of the duty cycle pulse width modulated signals from the controller 20. This duty cycle pulse interrupt routine is illustrated in FIG. 2 and provides for a determination of the duration of the pulse width provided by the computer 20 representing the requested percentage of maximum torque of the engine 10. A second interrupt routine executed by the controller 18 is a time driven interrupt at a high frequency provided at, for example, 12.5 millisecond intervals. This 12.5 millisecond interrupt routine is illustrated in FIG. 3.

Referring first to FIG. 2, the interrupt executed with each falling edge of the duty cycle signal provided by the brake traction control computer 20 is executed to determine the pulse width of the pulse of the duty cycle signal. The duty cycle represented by this pulse width represents the engine torque level request in terms of the percent of maximum possible engine torque. The routine is entered at point 30 and proceeds to a step 32 wherein the width of the just ended duty cycle pulse is stored in memory. This pulse width is comprised of a count in a timer register clocked by the system clock. At the next step 34, the duty cycle interrupt flag is cleared and at step 36, the pulse width timer register is cleared. The timer register is an element of a conventional input timer in the engine controller 18 in which the timer counts the system clock pulses during the high state of the pulse output of the brake traction control computer 20. In a logic sense, the pulse output of the brake traction control computer 20 functions as an enabling signal to a gate for transmitting clock pulses to the clock input of the timer register. Following execution of the steps 32–36, the program returns to the interrupted routine.

Referring to FIG. 3, the 12.5 millisecond interrupt routine which directs the operation of a number of subroutines for performing various tasks is illustrated. This routine is entered at point 38 and proceeds to execute a traction control routine at step 40 to establish the number of cylinders to be disabled and the spark retard required for traction control. This routine will be described in detail in FIGS. 4a, 4b and 4c. Thereafter, the routine executes a conventional fuel control routine at step 42 for controlling the injectors INJ1–INJ8 to provide for a scheduled air/fuel ratio of the mixture drawn into the respective cylinders. However, the injectors INJ1–INJ8 may be selectively disabled by the routine of step 40 to inhibit delivery of fuel independent of the fuel amount otherwise determined at step 42 for the individual fuel injectors.

A spark control routine is next executed at step 44 for establishing the ignition timing in the individual cylinders of the engine 10. In general, this routine establishes the ignition timing as close as possible to the MBT setting for maximum engine output torque. Generally this ignition timing value is obtained from a three dimensional electronic lookup table in memory in which the timing values are stored as a function of engine speed, and manifold absolute pressure. The spark control routine 44 further adjusts the calibration spark timing value according to the engine operating condition in accord with the spark retard established by the traction control routine 40 as will be described. Accordingly, the spark control routine 44 establishes a spark timing value for maximum output torque when traction control is not functioning and provides for retarding the spark timing value in accord with the traction control routine 40 to decrease the engine torque output for traction control. The engine controller 18 may include as a separate element thereof an electronic spark timing unit to initiate combustion in the various engine cylinders via the spark plugs SP1–SP8 in accord with the spark timing value established by the spark control routine 44.

Other routines may be executed by the interrupt routine of FIG. 3 to perform other engine/vehicle control functions. These routines are generally depicted at step 46 and may include, for example, control of the vehicle transmission.

Referring to FIG. 4, the traction control routine 40 of FIG. 3 is illustrated in detail. This routine is entered at point 48 and proceeds to step 50 at which the instantaneous value dcTQ of the requested percent of maximum possible engine torque represented by the duty cycle of the signal provided by the brake traction control computer 20 is computed. The duty cycle value is computed based upon the known repetition frequency of the pulse output of the brake control control computer 20 and the duty cycle pulse width stored at step 32 of the duty cycle interrupt routine of FIG. 2. For example, if the value stored at step 32 of FIG. 2 is representative of a pulse width of 8 milliseconds and the repetition frequency of the duty cycle signal from the brake traction control computer is 10 milliseconds, the requested percent of maximum possible engine output torque dcTQ determined at step 50 would be 80%.

The routine next determines whether or not to control the engine torque based upon (A) the instantaneous value dcTQ of the requested percent of maximum possible torque to provide substantially instantaneous engine torque control or (B) a filtered value dcfTQ of the requested percent of maximum possible engine torque. For example, there is a delay associated with pressurizing the brakes in response to a sensed excessive wheel spin condition so that it may be desirable to instantaneously reduce engine torque when the brake traction control computer 20 first senses an excessive spin condition while the brakes are being applied. It also may be desirable to instantaneously increase the engine torque in response to an increase in the requested percent of maximum engine torque when the throttle is closed.

The conditions for establishing a response to the instantaneous value dcTQ of the percent of maximum possible torque is established by the steps 52, 54 and 56. Particularly, step 52 determines whether or not a traction control active flag is set, step 54 determines whether an initial shutoff time-out value is equal to zero, and step 56 determines whether or not the throttle of the engine is closed such as represented by a closed throttle switch. If the traction control active flag is not set, or if the initial shutoff time-out value is not zero, or if the throttle switch is closed, a time in traction count $t_1$ is set to zero at a step 58 after which the filtered value dcfTQ of the requested percent of maximum torque is set equal to the instantaneous value dcTQ of the requested percent of maximum torque at step 60. Therefore, as long as the foregoing conditions do not change, the value of dcfTQ tracks the instantaneous value dcTQ.

If, however, step 52 determines the traction control active flag is set indicating engine torque is being controlled in response to a request from the brake traction control computer 20, and step 54 determines the initial shutoff time-out is equal to zero, and step 56 indicates the throttle switch is open, the routine provides for filtering the requested percent of maximum possible engine torque dcTQ in accord with a filter time constant that is a function of the time the system is controlling engine torque for traction control. This filtering is provided by the next steps 62, 64 and 66. Beginning at step 62, the time in traction count $t_1$ that was previously initialized to zero at step 58 is incremented at step 62. Step 64 then determines a filter time constant $T_c$ that increases as a predetermined function of the time in traction count $t_1$ established via step 62. The filtered requested percent of maximum engine torque dcfTQ is then determined at step 66 by means of the filter expression $dcfTQ = dcfTQ + T_c(dcTQ - dcfTQ)$.

The routine next determines the engine torque level required in relation to the actual engine torque (assuming all cylinders active) in order to meet the requested percent of maximum possible engine torque dcfTQ resulting from step 60 or step 66. First at step 68, the maximum possible engine torque MTQ is determined. This value is obtained from a read only memory lookup table as a predetermined function of engine speed. The actual engine torque TQ assuming all cylinders active is then computed at step 70. In one embodiment, this torque value is computed as illustrated in the U.S. Pat. No. 4,809,660 issued Mar. 7, 1989 and assigned to the assignee of this invention. The routine then determines at step 72 the actual percent, ATQ, of the maximum possible torque MTQ represented by the actual engine torque TQ. The percent, identified as NTQ, of the requested percent of maximum possible engine torque dcfTQ represented by the actual percent of the maximum possible engine torque ATQ is then determined at step 74. NTQ therefore represents the percent of actual engine torque represented by the requested value dcfTQ. As can be seen, if the actual engine torque output is equal to the requested torque level represented by the filtered requested percent of maximum possible engine torque dcfTQ, NTQ will be 100%. If the actual engine torque output is greater than the torque level represented by dcfTQ, NTQ will be less than 100% by an amount that is the percent engine torque reduction required indicating a needed torque reduction. Finally, if the engine torque output is less than the torque level represented by dcfTQ, NTQ will be greater than 100% indicating that no engine torque reduction is required.

The traction control active flag is next cleared at step 76. This flag will later be set if the routine subsequently determines that NTQ indicates a requirement to reduce engine output torque The routine then provides for control of the spark retard amount for reducing engine torque based on the needed torque reduction established at step 74. In general, the spark timing established by the spark control routine of 44 (FIG. 3) is retarded by an amount established by the traction control routine when the required torque reduction (the percentage amount that NTQ is less than 100%) exceeds a low threshold that is a function of engine speed. This condition is indicated when NTQ is less than a calibration constant KTQ stored in read only memory as a predetermined function of engine speed. According to this invention, the percentage of torque reduction required represented by the threshold KTQ is less than the percentage torque reduction resulting from disabling a single cylinder of the engine 10. According to the foregoing, at step 78, NTQ is compared to the threshold KTQ retrieved from a lookup table of calibration values stored in read-only memory as a function of engine speed. If the required torque level in terms of percent of the actual engine torque level is less than this threshold level, the program proceeds to a step 80 where the traction control active flag is set and then to step 82 where the amount of traction control spark retard required is obtained from a lookup table at step 82 as a function of engine speed. By use of the speed dependent spark retard amount via step 82, the torque loss across the complete RPM band can be shaped and the spark retard levels can be varied as a function of engine speed so as to control exhaust gas temperatures for protection of the catalytic converter 16. The engine torque reduction resulting from the spark retard value established at step 82 is a value less than the torque reduction resulting from disabling a single engine cylinder.

Anytime the required torque level NTQ exceeds the threshold KTQ, the program proceeds to execute a series of steps to ramp the spark retard value at a controlled rate to zero. This procedure begins at step 84 which determines if the traction control active flag was in a set condition in the previous execution of the traction control routine 40. If traction control was active in the last loop, spark retard ramping is enabled at step 86 by setting a spark retard ramp flag and a spark retard ramp step time $T_2$ is set at step 88 to a calibration constant $T_R$ establishing the ramp rate. Thereafter, when the traction control routine is executed, a series of steps for ramping the spark retard value SR to zero is executed. This process begins at step 90 where the program determines if the spark retard ramp flag is set. Assuming it is set indicating the spark retard has not yet been ramped to zero, a step 92 decrements the spark retard ramp step time $T_2$ after which the resulting value is compared to zero at step 94. If the ramp step time has not yet been decremented to zero, the spark retard is not decreased. However, whenever step 94 determines that the time $T_2$ has been decremented to zero via repeated execution of step 92, the spark retard ramp step time $T_2$ is reset to $T_R$ after which the spark retard value is decremented at step 98. The resulting spark retard value is then compared to zero at step 100. If the spark retard is not yet zero, a step 102 for clearing the spark retard ramp flag is bypassed. As long as the torque level threshold of step 78 is not met, repeated executions of the interrupt routine of FIG. 3 results in the spark retard value being continually stepped toward zero at time increments of $T_R$ to thereby ramp the spark retard to zero. When the spark retard has been ramped to zero as sensed at step 100, the spark retard ramp flag is cleared at step 102. Thereafter, during subsequent executions of the traction control routine, the ramp steps 92-102 are bypassed via step 90.

Following the spark retard control portion of the traction control routine, the program determines the number of cylinders to be disabled in addition to torque reduction established by spark retard in order to reduce the engine torque output so as to achieve the required percent NTQ of the actual percent of maximum torque MTQ. In general, the routine determines the number of active cylinders which when combined with the spark retard provided via the steps 78-102 would result in the required torque reduction to achieve the required torque level. This begins at step 104 where a cylinder number identifier ncyl is set equal to 8 corresponding to the 8-cylinder engine 10. Thereafter, the state of the traction control active flag is sampled. If the traction control active flag is not set indicating that all 8 cylinders are to be enabled, the steps for identifying the number of cylinders are bypassed and ncyl remains at 8.

Assuming that the traction control active flag is set, the routine then proceeds to identify the required number of active cylinders to establish the required engine torque output for traction control. To identify the number of cylinders to be disabled, the system provides a lookup table of percent torque level values addressed by engine speed for each allowable level of active cylinders beginning at seven and decreasing to a minimum allowable number of active cylinders ncylMIN. Each lookup table corresponding to a particular number of active cylinders stores engine speed dependent values ncylTQ representing the percent of actual torque with all cylinders active that would result from operation with that particular number of active cylinders. By sequentially comparing the values of ncylTQ retrieved from the lookup tables at the memory locations corresponding to the engine speed with the value NTQ representing the requested percent of actual torque with all cylinder active, the routine identifies the number of active cylinders required to decrease the engine torque output to a level corresponding to the requested torque level from the brake traction control computer 20.

If step 106 determines that the traction control active flag is set, a step 108 points to the first table corresponding to 7 active cylinders storing the values of ncylTQ as a function of engine speed representing the percent of actual torque with all cylinders active resulting from disabling one cylinder of the engine. At the next step 110, the value of ncylTQ corresponding to 7 active cylinders is retrieved from the lookup table identified at step 108 as a function of engine speed. At step 112, the retrieved value of ncylTQ is compared to the percent actual torque required NTQ established at step 74. If NTQ is less than the value ncylTQ retrieved from the lookup table indicating that the number of active cylinders corresponding to the lookup table will result in an engine torque output greater than the requested torque output, the program proceeds to step 114 where the lookup table associated with the next lower number of active cylinders is pointed to. This table functions in the same manner as the table first identified in step 108, but stores values ncylTQ resulting from one less number of active cylinders. Step 116 then decrements the value of ncyl to indicate one less number of active cylinders. Step 118 determines if the resulting numbers of cylinders ncyl is less than or equal to a minimum value representing the minimum allowable number of operating cylinders. Assuming first that the number of cylinders represented by ncyl is greater than the minimum value, the routine returns to step 110. The foregoing steps 110-118 will be repeated until step 112 indicates that the value of ncylTQ retrieved from the last lookup table pointed to is less than the required level NTQ indicating an excessive torque reduction level. At this time, the last value of ncyl identifies the number of operating cylinders to be established in order to achieve the engine torque reduction objectives for traction control as required by the brake traction control computer 20. When this number of cylinders has been identified by step 112, or when the number of operating cylinders represented by ncyl achieves the minimum value as determined at step 118, or if the traction control active flag is determined at step 106 to be reset, the program proceeds to a step 120 where a hysteresis is applied for increasing the value of ncyl. This step provides for hysteresis in order to inhibit rapid cycling between the number of enabled cylinders.

It may be desirable to further limit the minimum number of enabled cylinders. For example, it may be desirable to establish a minimum number of enabled cylinders as a function of vehicle speed, engine speed and engine coolant temperature. Accordingly, at step 122, the number of cylinders ncyl otherwise identified as set forth above is limited to a minimum value established by other vehicle and engine operating conditions as desired.

Thereafter, the cylinders of the engine 10 are disabled by disabling the fuel injectors INJ1-INJ8 according to the number of cylinders enabled via the foregoing steps. The cylinders are each selectively disabled by zeroing out the respective fuel command at the output port of the respective fuel injector at the engine controller 18. If all of the cylinders are enabled as indicated by ncyl being equal to 8, the routine returns to the 12.5 millisecond interrupt routine of FIG. 3 via the step 124. However, if ncyl is less than 8, the program proceeds to a step 126 where injector number 7 disable flag is set providing for zeroing the pulse width at the output port to the injector for that cylinder. Thereafter the value of ncyl is compared to 7 at step 128. If equal to 7, the program returns to the routine of FIG. 3 via step 128. Otherwise, the injector number 6 disable flag is set at step 130 to provide for disabling of the injector number 6. If ncyl is greater than or equal to 6, the program returns to the routine of FIG. 3 via a step 132. Otherwise, an injector number 4 disable flag is set at step 134 to disable the number 4 fuel injector. If ncyl is greater than or equal to 5, the program returns to the routine of FIG. 3 via a step 136. Otherwise, the injector 1 disable flag is set at step 138 to provide for disabling injector number 1. The foregoing steps are continually repeated until the number of enabled cylinders are equal to ncyl. Assuming that the number of cylinders to be enabled is the minimum number, the program proceeds ultimately to a step 140 where ncyl is compared to the minimum number of cylinders plus 1. If greater than this number, the program returns to the routine of FIG. 3 via step 140. Otherwise, the injector n disable flag is set to disable injection of fuel to injector n, resulting in the minimum number of enabled cylinders.

The foregoing description of a preferred embodiment of the invention for purposes of illustrating the invention is not to be considered as limiting or restricting the invention since many modifications may be made by the exercise of skill in the art without departing from the scope of the invention.

The embodiments of the invention in which an exclusive property or privilege is claimed are defined as follows:

1. A method of traction control for a vehicle having wheels driven by an engine having fuel injectors delivering fuel to cylinders of the engine and having an ignition system adapted to initiate combustion in each of the cylinders in timed relation to engine rotation in accordance with a spark timing value, the method comprising the steps of:
   sensing an acceleration spin condition of the wheels;
   determining an engine torque reduction amount as a predetermined function of the acceleration spin condition;
   adjusting the spark timing value in response to a determined engine torque reduction amount (A) in a direction effecting a reduction in the engine torque output and (B) by an amount resulting in an engine torque reduction that is a predetermined amount less than a torque reduction amount resulting from disabling a single one of the fuel injectors;
   when the determined engine torque reduction amount exceeds the engine torque reduction achieved by the step of adjusting the spark timing value, determining a number of injectors to be disabled from injecting fuel to achieve the determined torque reduction amount; and disabling the determined number of injectors to inhibit delivery of fuel to the respective cylinders, whereby the step of adjusting the spark timing value provides for control of engine torque output when the determined engine torque reduction amount is less than the torque reduction that would result from disabling a single fuel injector.

2. The method of claim 1 further including a step of measuring engine speed and wherein the step of adjusting the spark timing value further includes a step of determining the spark adjustment amount as a predetermined function of the measured engine speed.

3. A method of traction control for a vehicle having wheels driven by an engine having fuel injectors delivering fuel to cylinders of the engine and having an ignition system adapted to initiate combustion in each of the cylinders in timed relation to engine rotation in accordance with a spark timing value, the method comprising the steps of:

sensing an acceleration spin condition of the wheels;

determining a requested percent reduction in engine torque output in response to a sensed acceleration spin condition;

adjusting the spark timing value in response to a requested percent reduction in engine torque (A) in a direction effecting a reduction in the engine torque output and (B) by an amount resulting in a percent reduction in engine torque output that is a predetermined amount less than a percent reduction in engine torque output that would result from disabling a single one of the fuel injectors;

when the requested percent reduction in engine torque output exceeds the percent reduction in engine torque output achieved by the step of adjusting the spark timing value, determining a number of injectors to be disabled from injecting fuel to achieve the requested percentage reduction in engine torque output; and disabling the determined number of injectors to inhibit delivery of fuel to the respective cylinders, whereby the step of adjusting the spark timing value provides for control of engine torque output when the requested percent reduction in engine torque output is less than the percent reduction in engine torque that would result from disabling a single fuel injector.

* * * * *